United States Patent [19]

Keidel et al.

[11] 4,264,788

[45] Apr. 28, 1981

[54] DAMPED ULTRASONIC DETECTION UNIT

[75] Inventors: John F. Keidel, Blue Bell, Pa.; Larry P. Kahhan, Sicklerville, N.J.

[73] Assignee: Princo Instruments, Inc., Southampton, Pa.

[21] Appl. No.: 8,170

[22] Filed: Jan. 31, 1979

[51] Int. Cl.³ .................... G01F 23/28; H01L 41/10; H04R 17/00
[52] U.S. Cl. ........................ 179/110 A; 179/180; 310/327; 340/621
[58] Field of Search ............. 310/327, 326; 179/180, 179/110 A; 340/621

[56] References Cited

U.S. PATENT DOCUMENTS

| | | | |
|---|---|---|---|
| 2,565,159 | 8/1951 | Williams | 179/110 A X |
| 2,707,755 | 5/1955 | Hardie et al. | 310/8.2 |
| 2,881,336 | 4/1959 | Elion | 310/8.2 |
| 3,185,868 | 5/1965 | Coyle et al. | 310/8.2 |
| 3,200,369 | 8/1965 | Neubauer et al. | 340/10 |
| 3,376,438 | 4/1968 | Colbert | 310/8.2 |
| 3,416,012 | 12/1968 | Jackson et al. | 310/8.2 |
| 3,427,481 | 2/1969 | Lenahan et al. | 310/8.2 |
| 3,555,311 | 1/1971 | Weber | 310/8.3 |
| 3,733,590 | 5/1973 | Kaufman | 340/173.2 |
| 3,821,834 | 7/1974 | McElroy | 29/25.35 |
| 3,925,692 | 12/1975 | Leschek et al. | 310/327 |
| 3,950,660 | 4/1976 | McElroy | 310/9.1 |
| 4,081,889 | 4/1978 | Levine | 29/25.35 |
| 4,130,018 | 12/1978 | Adams et al. | 310/327 X |

FOREIGN PATENT DOCUMENTS

1437376  10/1968  Fed. Rep. of Germany ........... 179/180

OTHER PUBLICATIONS

Sales Bulletin, "Ultrasonic Air Transducers Model 70100", Linden Laboratories, Inc., 1974.
Temporary Data Sheet, "Model 70130 Air Acoustic Transducer", Linden Laboratories, Inc. (Undated).
Sales Bulletin 29, "Air Ultrasonic Transducers, Model TR-89B/Type 40", Massa Corporation (Undated).
Sales Bulletin L-12-77, "Ultrasonic Point Level Control, Model L1560", Princo Instruments, Inc., Dec. 1977.
Sales Bulletin L-9-78, "Ultrasonic Continuous Transmitter, Model L1660", Princo Instruments, Inc., Oct. 1978.

*Primary Examiner*—Thomas W. Brown
*Attorney, Agent, or Firm*—Charles H. Lindrooth

[57] ABSTRACT

This invention relates to damping pads and accoustical horns for use with transducer assemblies. The problems of proximity detection ranges, subfreezing operating temperature ranges, ringing and backwave reflection are addressed. In a preferred embodiment of an ultrasonic level control indicator using a piezoelectric transducer, a resilient, compressible sound absorbing damping material (like polyurethane pads) is compressed against the transducer vibrating member to decrease ringing and backwave effects. An acoustical horn assembly with a tapered opening is positioned adjacent the transducer to improve the signal.

9 Claims, 10 Drawing Figures

DAMPED ULTRASONIC DETECTION UNIT

BACKGROUND OF THE INVENTION

1. Field of the Invention

This invention relates to electroacoustic transducers in general, and to ultrasonic level indicators and controls incorporating such transducers in particular. Though it is especially useful for ultrasonic frequency applications, it also has beneficial uses in sonic frequency applications as well.

2. Description of the Prior Art

Electroacoustic transducers are well-known devices for converting electrical signals into sound waves and sound waves into electrical signals.

Such transducers used with conventional ultrasonic level controls act as both loudspeakers and microphones. Acting as a loudspeaker, the transducer emits a burst of high frequency sound energy which is above the range of human hearing. This sound wave travels down into a container, such as for example a storage tank, where it is reflected from the surface of the substance whose level is being measured. The reflected wave or "echo" is then picked up by the same transducer, now acting as a microphone. Thus, the transducer performs both the sound transmitting and receiving functions.

The elapsed time between the sending of the transmitted signal and the arrival of the received signal is proportional to the distance between the transducer and the reflecting surface. Measurement of this time lag can thus be translated electronically into measurement of the level. The signal thus obtained may be used for control purposes and is usually displayed on a digital or analog indicator and/or used to control input or exit valves to the tank.

A major advantage of ultrasonic level control systems is the contact-free nature of their operation. This permits the measurement of sticky or gummy materials, of food stuffs where contact is unhygienic and of highly abrasive or corrosive materials which would act to degrade any level indicator that comes into contact with the measured substance.

Two types of transducers are widely used in ultrasonic level control applications: magnetic transducers and piezoelectric transducers (commonly called crystal transducers).

Magnetic transducers operate much like conventional loudspeakers. They have similar construction to a high-fidelity, high frequency tweeter-type loudspeaker. However, custom designed magnetic transducers adapted for ultrasonic level control use are very expensive, costing up to several hundred dollars apiece, and have very high power requirements.

Piezoelectric transducers, on the other hand, are relatively inexpensive, generally costing only about one-eighth to one-quarter as much as their magnetic counterparts. Some basic crystal transducers are available at a cost of under ten dollars. Crystal transducers have several disadvantages, however, in their use as ultrasonic level control devices.

For level control operations in most chemical process applications, detection ranges on the order of 1.5 feet to 20 feet, or more, are desired. Because of these range requirements, the present state of the art piezoelectric transducers used in ultrasonic level control applications are typically the larger and more expensive elements, that are constructed of such materials as barium titanate and lead zirconate titanate. The physical size of these elements is typically about 2 inches or more in diameter and a ¼ inch or more in thickness. Such sizes are required to deliver the large amount of power needed to achieve good maximum range detection. Very high power, on the order of up to 1,000 watts at a 1 percent duty cycle (time on various time off) is conventionally used to obtain long range operation (above 15 feet.).

Piezoelectric transducers that satisfactorily send and receive level control information over long distances do not, however, perform satisfactorily in low temperature environments. The reason for this is that piezoelectric elements which are large enough to achieve these long ranges tend to become brittle and crack when performing in low temperatures. Typical operating temperature range figures for a magnetic transducer unit are $-40°$ F. to $+200°$ F.; the typical range for a conventional crystal unit is about $+32°$ F. to $+200°$ F. Conventional crystal devices are thus not suitable for measuring levels in outdoor storage and transfer tanks in cold climates as in Minnesota or Alaska.

On the other hand, the relatively inexpensive small transducer elements, sized on the order of ¼ inch in diameter and 10 mils thick, which operate at low power and whose performance is not degraded by low temperatures, have poor range detection performance characteristics and do not possess the long range capabilities of large crystal units. The maximum range of typical small transducer units is about 1 to 2 feet.

Both large and small crystal units have disadvantages which affect their ability to have suitable minimum range detection characteristics. One such disadvantage is the existance of undesirable side lobes in the directional radiation pattern of the transducer. Such side lobes represent signals that are emitted in unwanted directions and cause false echoes, such as by being reflected from the sides of storage tanks instead of from the surface of the substance whose level is being measured. For use as a proximity indicator, the transducer sound dispersion pattern should be as restricted as possible, and preferably should be in a searchlight beam type of pattern.

Another disadvantage that limits the minimum distance for crystal transducer detection is the phenomenon of "ringing". Ringing is the tendency of an excited crystal to sustain oscillation in its natural resonant frequency mode after the excitation signal has been removed. Ringing is especially troublesome in ultrasonic level control operations because the piezoelectric element is usually driven at its resonant frequency. Ringing causes errors in level detection at short distances because at such distances, the signal has a much shorter travel time. Thus, the transducer may still be ringing when the echo signal is received, which makes it impossible to distinguish between the ringing signal and the echo signal. For short range distance detection, reflection of the backwave, as from the rear of the transducer housing, causes problems similar to ringing.

SUMMARY AND OBJECTS OF THE INVENTION

It is a primary object of the present invention to provide a level control device that exhibits both good detection range characteristics and good operating temperature range characteristics, and especially to provide such a device that operates satisfactorily at subfreezing temperatures.

It is another object of this invention to provide a continuous level monitoring device that can take level measurements at shorter distances than conventional devices.

It is another object of this invention to provide a piezoelectric transducer that exhibits good range detection performance characteristics over a wide operating temperature range, at relatively low cost.

It is a related object of this invention to provide relatively simple means by which commercially available low cost transducers can be modified to improve their performance characteristics for level control operations.

It is a further object of this invention to provide a single low cost damping means for crystal transducers used in both the transmit and receive mode to simultaneously lessen the deleterious effects on detection operations caused by both ringing and backwave reflection phenomena.

It is a still further object of this invention to provide means by which undesirable effects of side lobes in the directional radiation pattern of the sonic waves emanating from a low performance transducer are eliminated simultaneously with minimization of unwanted ringing.

In summary, these and other objects and advantages of the invention are accomplished by the use of a novel arrangement of damping pads and a horn assembly in conventional transducer assemblies. The detection range of low performance, relatively inexpensive transducers is increased and the detrimental echo effects of the side lobes of such transducers are eliminated by the addition of a horn, the narrow end of which is placed adjacent to the driving end of the transducer element. In a preferred embodiment, described in greater detail below, the horn is shaped with its side walls diverging at an angle which permits the front lobe signal of the transducer to be preserved and amplified, while eliminating the side lobes. A decrease in the effects of ringing and backwave reflections is accomplished by providing a resilient damping material compressed against the back of the transducer oscillating element. In a preferred embodiment, a plurality of polyurethane foam pads or wafers are held in a state of compression within the casing of a conventional transducer element.

BRIEF DESCRIPTION OF THE DRAWINGS

The nature of the invention may be understood best from a study of the attached drawings, in which.

DESCRIPTION OF THE PREFERRED EMBODIMENT

A preferred embodiment of the current invention is described in its application and use as an ultrasonic level indicator. This embodiment is presented by way of detailed illustration only, and not by way of limitation, of the many sonic and ultrasonic uses to which this invention can be put.

Figure 1:
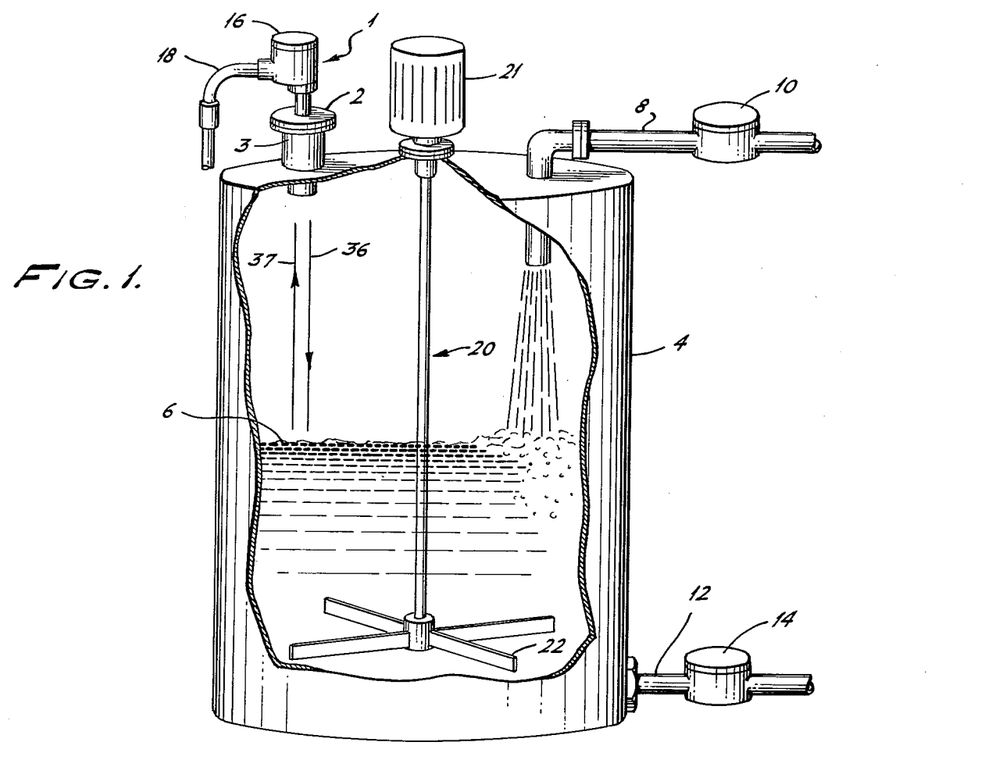
FIG. 1 is a cutaway view of a typical application of ultrasonic level control to measure the level of a substance in a storage tank.

FIG. 1 shows a typical application of such a level indicator. Ultrasonic level control device 1 comprises a housing which is interconnected to a mounting flange 2 which is bolted or otherwise fastened by suitable fastening means to the receiving port 3 of a conventional storage tank 4.

The storage tank 4 is used for the storage or processing of a substance such as liquid 6 which enters the storage tank by means of filler pipe 8 under the control of automatic valve 10. Liquid is retrieved from the tank by means of drain pipe 12 which is controlled by automatic valve 14. The ultrasonic level control may be used to provide an electrical signal for the regulation of either of valves 10 or 14, and also may be used to provide a continuous indication of the level of liquid 6 in the tank. Both the operation of the transmit and receive functions of the transducer element of ultrasonic level control and the receive signal processing functions necessary to control valve 10 or 14 and provide level indication are controlled by electronic circuitry located in housing 16. Conduit 18 provides means by which electrical power input and output for operation of the equipment may be connected to the housing 16. Also illustrated in FIG. 1 is a conventional stirrer assembly 20 comprising a stirrer motor 21 which drives stirrer blades 22 used in processing the stored liquid.

Throughout this detailed disclosure, references to "front" ends or portions of elements are references to the ends or portions of those elements located closest to the surface of the substance whose level is being measured; and references to "rear" ends or portions of elements are to ends or portions located farthest from the surface of such substance.

Figure 2:
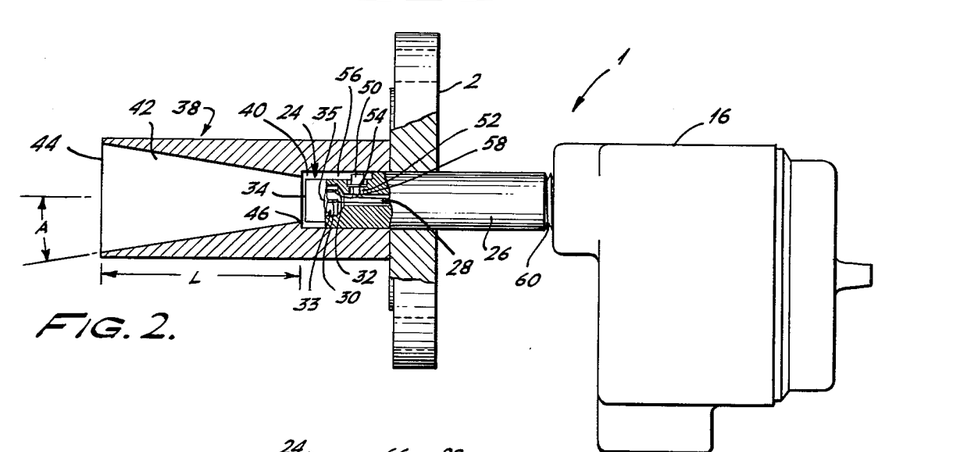
FIG. 2 is a side view, in partial section, of a transducer assembly of the present invention shown in its application as a level indicator.

FIG. 2 shows a transducer element or "button" 24, described in greater detail below, mounted on the front end of stem 26. This stem has a central bore 28 through which conductors 30 and 32 extend to provide electrical communication between the transducer element and the electronic circuitry located in housing 16.

Stem 26 is preferably chosen as a solid cylinder with a very narrow bore 28. The use of a hollow stem is to be avoided because it can lead to undesirable acoustical effects. Transducer button 24 is positioned on the front of stem 26 so that oscillating member 34 thereof is aligned at right angles to the stem axis. It has been found advantageous to use a yieldable bonding means 35, such as RTV 182 electrical grade "SILASTIC" available from General Electric, to acoustically isolate the element 24 from stem 26. To aid in mounting, a depression 33 can be provided at the front of stem 26 into which a mass of the bonding means 35 can be placed.

Fastened to the circumference of stem 26 at a point intermediate the ends of the stem is circular mounting flange 2, used to fasten the level control device to receiving port 3 of storage tank 4. Stem 26 is positioned axially of flange 2 so that the stem will depend front end down, and normal to the surface of liquid 6, when the flange is bolted to conventional receiving port 3. Thus, oscillating member 34 of transducer 24 will transmit and receive sound waves 36 and 37 travelling perpendicularly to the liquid surface (see FIG. 1).

At the front end of stem 26, adjacent the front face of mounting flange 2, is situated an acoustical horn assembly 38. The rear end of acoustical horn 38 has a central bore 40 into which the stem 26 and transducer assembly 24 can be fitted. The outside diameter of stem 26 is selected to be approximately the same dimension as but slightly larger than the outside diameter of button 24. This difference in relative sizes is to facilitate mounting and assembly. The diameter of bore 40 is selected to provide a mating fit with stem 26.

A tapered channel, such as frusto-conical opening 42 having a large or sound emitting end 44 and a small end or throat 46, extends axially outwardly from the bore 40. The inside diameter of large opening 44 is approximately equal to the outside diameter of horn 38. The inside diameter of small end opening 46 is chosen to be approximately the same as the external diameter of the oscillating member 34 of transducer element 24.

Horn 38 is positioned so that its rear end is suitably fastened by means of epoxy or other cement to the front side of mounting flange 2. The overall length of horn 38 is chosen to provide an "active" horn length "L" (see FIG. 2) between cavity large end 44 and small end 46 which produces the desired acoustical shaping and amplification of the signal transmitted from and to element 24. As seen later with reference to FIGS. 5C and 5D to shape the three-leaf clover sound wave pattern of a typical low cost transducer button having a diameter of about 1 inch and operating at a frequency of about 40 KHz, the use of a horn 38 having an effective horn length of about 4½ inches and a 7:1 ratio of large end area to small end area gave an acoustical amplification factor on the order of 7 to 10. An outer end 44 of about 2¾-inch I.D. permits horn 38 to be conveniently received into a 3-inch standard diameter pipe mounting receiving part 3 (FIG. 1). The angle "A" (FIG. 2) of conical opening 42 between its central axis and side wall is chosen to eliminate the side lobes of element 24 while permitting the greater part of the front lobe of element 24 to pass through. In the example below, an angle "A" of 9° to 10° was used to eliminate the side lobes of a typical low cost transducer radiation pattern. Useful level detection ranges on the order of 25 to 30 feet were thus attainable.

The preferred position of oscillating member 34 relative to throat 44 of opening 42 is determined empirically by sliding stem 26 with button 24 attached back and forth axially within bore 40 while pointing the operating device at a reference reflecting surface, such as the floor or wall. The position of maximum echo signal amplitude is determined by means of test equipment, e.g., an oscilloscope. The stem is then fixed relative to the horn in this "tuned" position by suitable bonding means. One possibility is to use a cement that remains wet until tuning is completed, then hardens. Typical "tuned" position of oscillating member 34 is about 1/16 to ¼ inch rearward of the throat 46. Reduced return signal was obtained when member 34 touched the throat 46.

The materials for construction of horn 38, mounting flange 2 and stem 26 are selected based on the intended environment of operation. A preferred material for many applications is a plastic such as PVC which is lightweight, of low cost and easily molded. The horn, flange and stem can be conveniently fastened rigidly to one another by use of an epoxy or cement, such as PVC cement.

The speed of sound in air varies with air temperature. Where continuous monitoring and indication of the level of liquid 6 is desired, it is advantageous to provide a means by which the ambient air temperature can be measured and the echo detector output automatically temperature adjusted to give consistent readings. Sensor 50, shown in FIG. 2, is optionally provided for this purpose.

Sensor 50 can be located at any convenient position on device 1 to detect the ambient temperature of the transmitting and receiving medium. In FIG. 2, the temperature sensor 50 is shown mounted on stem 26, located in a recess 52 adjacent to and slightly behind element 24 and firmly positioned therein by suitable bonding means, such as epoxy 54. Longitudinal cut-out 56 is provided on one side of the front end of stem 26 to permit the transmission medium to pass to sensor 50. The sensor leads 58 carry sensing information from sensor 50 through central bore 28 of stem 26 to be processed electronically in circuitry located in housing 16.

The rear end of stem 26 is provided with suitable coupling means, such as external threads 60 to fasten the transducer assembly to electronic assembly housing 16. Any of a variety of other known fastening techniques can be employed to satisfy user requirements, such as NPT threaded or explosion proof connections.

Any of several commercially available small, low cost transducer assemblies that have good operating temperature range characteristics can be utilized in realizing this invention. Suitable selection can be made from among tuned, single frequency devices which utilize a thin element of piezoelectric ceramic material bonded to a metallic oscillating member. Suitable devices include the model TR-89B/Type 40 electroacoustic transducer manufactured by Massa Products Corporation of Hingham, Mass., or a 40 KHz model 70100 ultrasonic air transducer manufactured by Linden Laboratories, Inc., of State College, Pennsylvania. These devices can be suitably mounted and modified in accordance with the teachings of the invention so as to greatly increase their range detection performance characteristics and provide a suitable wide temperature range control indicator.

Figure 3:
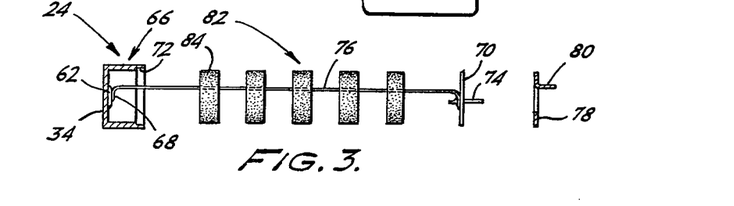
FIG. 3 is an exploded side view showing the positioning of damping pads relative to a conventional transducer unit to reduce ringing and backwave reflection.

FIG. 3 shows, in exploded view, the elements of a typical suitable transducer assembly which comprises a thin, circular piezoelectric disk 62 bonded to the inside of the circular front plate or oscillating member 34 of a cup-shaped metallic housing or shell 66. A suitable electrode 68 is mated to the rear face of piezoelectric disk 62. The front plate or oscillating member 34 of metallic shell 66 serves the purpose of a second electrode. An insulated end plate 70 rests in the assembled device on inside shoulder 72 of casing 66. A first terminal post 74 stands centrally of the exposed portion of insulated end plate 70. Electrical conductor 76 is suitably connected between electrode 68 and post 74 by means of soldering or like method. Annular metallic retainer tab 78 is brought into contact with casing 66 over insulated end plate 70 at shoulder 72 to be suitably held thereon as by means of a friction or force-fitted mechanical connection. A second terminal post 80 extends rearwardly from said annular tab 78 and is electrically connected to front plate electrode 34 by means of metallic housing 66 to form together with first post 74 the points of electrical connection for leads 30 and 32

(see FIG. 2) providing an electrical link to the circuitry of housing 16.

The means for mounting the assembled transducer assembly 24 on the front of stem 26 has already been described. Moisture-proofing and protection of the mounted transducer element can be provided by a suitable coating. The coating must be one that will not interfere with element performance. A suitable coating for this purpose is the HUMISEAL coating currently used in moisture-proofing printed circuit boards.

In practicing the invention, utilizing a commercially available transducer, the back of the housing is opened by removing tab 78 and insulated plate 70. Suitable resilient damping means 82 is compressed into the interior of casing 66 and plate 70 and retaining tab 78 are replaced.

Suitable materials for damping means 82 are ones which exhibit both mechanical damping and sound absorption characteristics. A preferred material is open-cell polyurethane foam; although other springy or resilient, compressible sound absorbing materials may be employed, including other resilient open-cell foam or similar spongy materials. Resilient, compressible masses or wads of cotton, fiberglass (especially for operating temperatures approaching 200° F.) or other fibrous materials are also useable, provided the wad is thick enough and compressed enough so that a restoring pressure will be exerted by the compressed wad. Hard rubber and cork were not found acceptable.

The use of a resilient, compressible material for use as damping pad 82 that also has good acoustical absorption qualities provides certain benefits. When oscillating member 34 is set into mechanical vibrations, a sound wave not only is propagated from the front surface of housing 66, but a backwave is also propagated toward the rear of housing 66. Selection of a damping pad material that will absorb the backwave will reduce interference with level detection operations caused by backwave reflections picked up on the transducer in its receive mode.

Figure 3A:
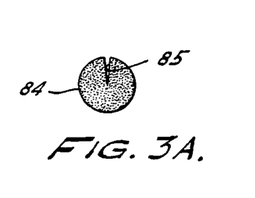
FIG. 3A is a plan view of a single damping pad of the present invention.

The damping means 82 can be a single mass of material or one pad, but is preferably a plurality of thin laminae or wafers 84, a cross-sectional view of one of which is shown in FIG. 3A. Each wafer has a circular cross section of a slightly larger diameter in the uncompressed state than the inside diameter of the interior of cup-shaped housing 66. Each wafer 84 is preferably slit radially with an axially planar cut 85 to provide a means by which conductor 76 can pass from electrode 68 to post 74. The number of laminae or wafers 84 is selected so that the combined thickness is greater than the internal depth of cup-shaped housing 66. Thus, when the pads are inserted into the interior of housing 66, they will be compressed against element 62 and oscillating member 34 when end plate 70 and tab 78 are replaced on housing 66.

Using a Massa model TR-89B/Type 40 transducer, wherein the inside of the housing is about ½ inch in depth and ⅞ inch in diameter, excellent results were obtained using five or six ¼-inch thick, 1-inch diameter polyurethane foam wafers. The wafers were cut by the use of a 1-inch punch from commercially available sheets of ¼-inch thick foam. Fewer than 5 pads did not give sufficient damping to achieve the desired reduction in ringing; the use of more than six pads provided too much damping and interfered with the transducer sensitivity. The use of a plurality of wafers rather than a single wafer of combined thickness was found beneficial because they were easier to pack into housing 66, which resulted in more uniform compression and exertion by force against elements 70 and 78 in the assembled device. Frictional engagement of the edge of each pad with the inside walls of housing 66 aids in assembly. In packing the Massa device, the pads could be rested on shoulder 72 (1 inch in diameter) and then prodded into uniform compression against front wall 34 with an implement such as a pencil. The addition of the polyurethane foam pads did not affect the frequency of the operating device and no retuning was necessary.

The operation of the preferred embodiment of the invention in its use in a level control using a modified commercially available 40 KH$_z$ transducer is now described.

Piezoelectric crystals, like element 62, exhibit the general characteristic of flexing in mechanical oscillation when alternating electrical impulses are applied across the crystal faces. The mechanical vibration sets up pressure variations in the air causing the transmission of an outgoing sound wave (transmit mode). Similarly, the mechanical back and forth movement of the crystal in response to an incoming sound wave flexes the crystal in mechanical oscillation that produces alternating voltage levels across the transducer and generates an alternating electrical impulse at the electrodes (receive mode). If the crystal 62 is of a small size, it is small enough to flex without breaking when operating in low temperature environments.

Figure 4:
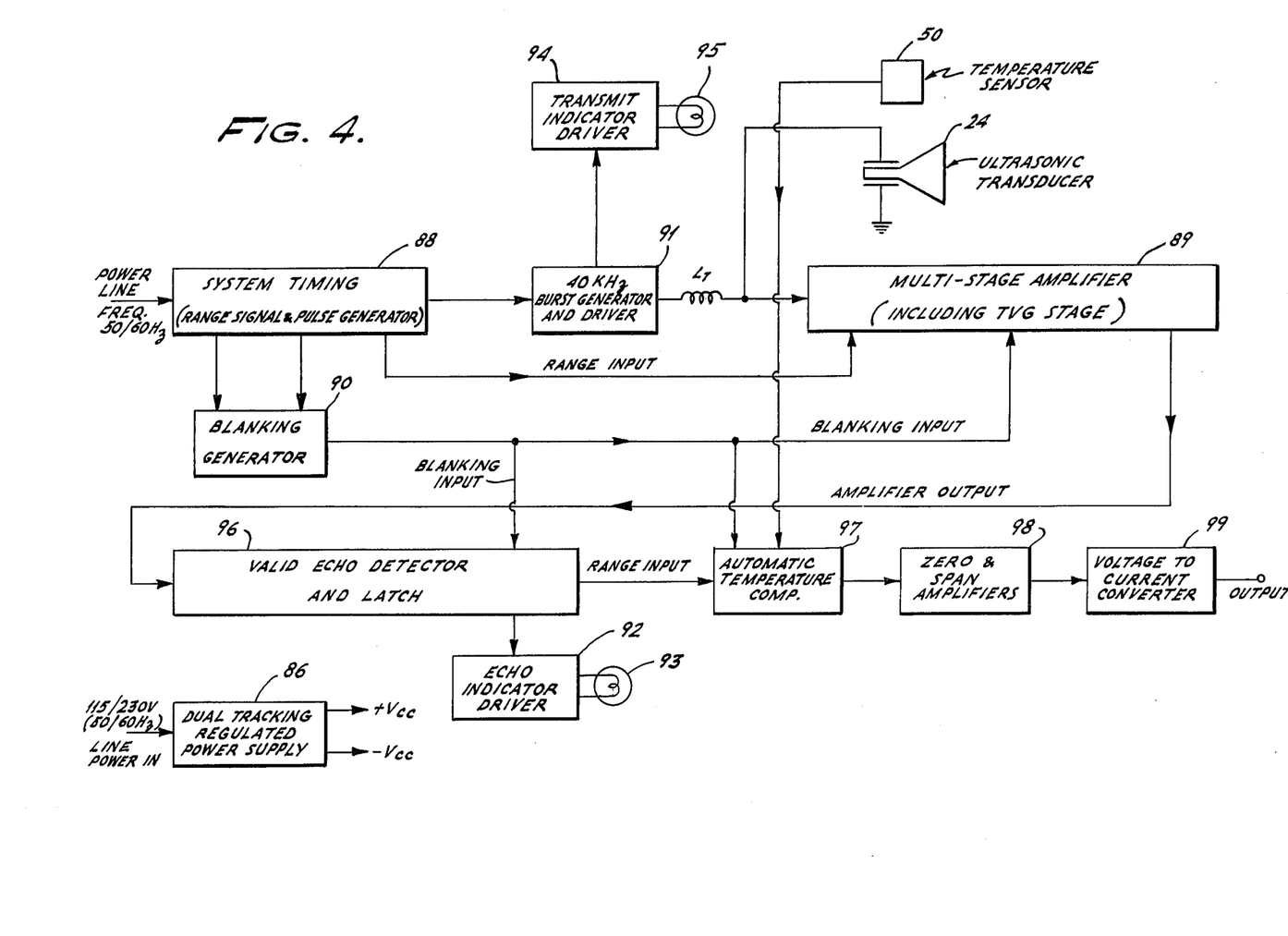
FIG. 4 is a block diagram of control circuitry used to operate the transducer in its application as a level indicator.

The crystal 62 (FIG. 3) is firmly bonded to oscillating member 34 so that member 34 acts as a diaphragm or sounding board to transmit and receive sound waves. Member 34 vibrates responsive to the flexing of element 62; and element 62 flexes in response to movement of member FIG. 4 is a block diagram of typical conventional circuitry used to drive the transducer and analyze the received signals. All stages in the electrical system are powered from a dual tracking regulated power supply 86. System timing is derived from the line frequency (50/60 H$_z$) as the reference frequency for conventional system timing circuits 88. The system timing circuits 88 detect zero crossing points of the input line frequency and shape the waveform into a train of pulses 3 milliseconds wide, which are spaced 8.33 milliseconds apart (double the 60 H$_z$ line frequency). This pulse train is then processed in a decade counter to give a first output to provide ranging input and gain programming to the amplifier circuit 89. This output of the decade counter is also combined with the pulse train to provide a system inhibit function at the beginning of each clock cycle by means of blanking generator 90. As the first output of the decade counter rises, the 40 KH$_z$ burst generator and driver circuit 91 is enabled which drives the transducer with about a 0.5 to 1.0 milliseconds burst of 40 KH$_z$ signal. This oscillating impulse induces mechanical flexing of element 62 (FIG. 3) which causes mechanical oscillation of the front plate or disk 34 of transducer housing 66.

Blanking of the echo receiving and analyzing circuits 89 and 96 is required because when the transmitter is shut off, the transducer will continue to mechanically vibrate or to "ring" at its natural resonant frequency, at sufficient amplitude that the transducer acting as a receiver will detect the ring as an echo. It is necessary to allow this ringing to decay before enabling the receiver circuitry.

The duration of the ringing limits the minimum detection range capability of the system. Sound travels in air at 25° C. at a speed of about 1100 feet per second, or 1.1 feet per millisecond. If ringing interfering with echo signal detection persists for 10 milliseconds, for example, minimum detection range of such a transducer used for level control purposes can be no less than 5.5 feet. Ringing is especially a problem in level control applications because in order to attain the best sensitivity for transmitting and receiving long range signals, the transducers are operated at their natural resonance frequency. The modification of the conventional device by the use of damping pads 84 as described above in reference to FIG. 3, greatly reduces ringing time and substantially decreases the minimum detection range. Thus, blanking time can be reduced to 3 milliseconds or less, corresponding to minimum ranges of 1.5 feet or less.

When the burst generator and driver 91 turns on, it enables a transmit indicator driver 94, which drives an indicator, such as an LED or incandescent bulb 95, to provide a visual indication of transmitter operation.

The transmitted signal 36 (FIG. 1) is acoustically shaped by cavity 42 in amplifier horn 38 (FIG. 2) already described. Horn 38 also eliminates the undesirable side lobe signals that reflect off the sides of the tank and give false distance readings. Transmitted wave 36 (FIG. 1) reflects off the surface of liquid 6 and the reflected wave 37 is directed through horn cavity 42 to member 34 (FIG. 3) where it causes mechanical oscillation of member 34. This flexes piezoelectric element 62 which produces oscillating voltages at electrodes 34 and 68 (FIG. 3).

Echo signals thus generated are transmitted to the circuitry in housing 16, where they are amplified in the multi-stage amplifier 89. Amplifier 89 includes an amplifier stage whose gain varies as a function of time (i.e., as a function of detected range distance), from, for example, a minimum gain of about 0.25 for close-in signals coming back from 1.5 feet distances up to a maximum gain of about 11 for echo signals coming back from 30-foot distances. The amplified echo signal is then digitized for further processing by a valid echo detector and latch 96, which analyzes the echo signal and determines whether several cycles of the waveform are present before outputting a digital pulse, thus ensuring that brief noise impulses (such as electrical circuit transients) are not detected as an echo. This digitized echo is then used to reset a latch which has been set at the beginning of each clock cycle. The output of the latch is a digital signal with its duty cycle (and hence the D.C. average level) directly proportional to the distance of the reflecting surface from the transducer. Since the AC power line from which the clock signal is derived is very stable, such a system provides excellent accuracy.

When a valid echo is detected, echo indicator driver 92 is enabled which drives an indicator, such as an LED or incandescent bulb 93, to provide a visual indication of the detection of a valid echo signal.

Because the propogation velocity of sound through air is dependent upon the ambient air temperature, it is desirable to provide temperature compensation to eliminate variations in output level due to temperature changes. This is accomplished by means of temperature sensor 50 (FIGS. 2 and 4) and automatic temperature compensator 97. The temperature corrected signal is filtered to extract its D.C. content, it is then offset, and scaled by a zero/span amplifier circuit 98 and applied to a voltage-to-current converter 99, which provides a current output (typically about 4 to 20 milliamperes) which is proportional to the distance of the reflecting surface of liquid 6 (FIG. 1) from the transducer, i.e., proportional to the level of the substance being measured.

FIGS. 5A through 5E represent oscilloscope patterns of waveforms obtained in tests conducted using a Massa model TR-89B/Type 40 transducer operating at resonant frequency. The tests were conducted using an ultrasonic level control assembly with construction similar to that shown in FIG. 2, except without temperature sensor 50, stem cutout 56 or recess 52. The transducer button was mounted by means of 182 RTV SILASTIC compound to the front end of a solid PVC stem. This Massa device costs less than 10 dollars, has a maximum detection range of only 3 to 4 feet if not modified by the invention, and had a distinct tendency to ring that seriously interfered with distinguishing the echo signal.

Figure 5A:
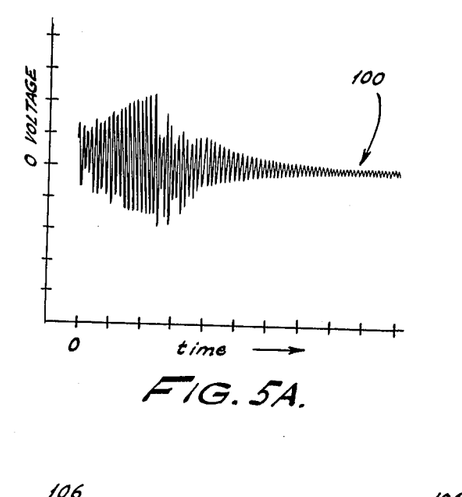
FIGS. 5A through 5E are schematic representations of oscilloscope patterns of the ultrasonic waves generated by transducers with and without the features of the invention showing the advantages of the addition of the damping pads and the horn to a low cost commercially available transducer device.

FIG. 5A illustrates the transmission waveform pattern (measured across the transducer) of the basic Massa transducer device without the addition of damping means 82 (FIG. 3) and without the addition of an acoustical horn 38 (FIG. 2). The long decay time is readily seen. The end of ringing is indicated by arrow 100 in FIG. 5A. The horizontal scale of FIG. 5A is 0.2 milliseconds per division and the vertical scale is 10 volts per division. The transmit oscillator is tuned to the ultrasonic transducer's natural frequency.

Figure 5B:
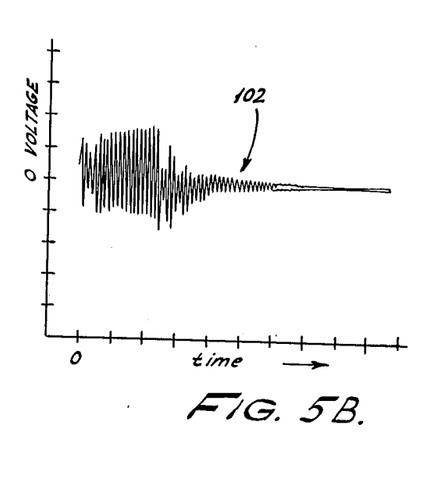

FIG. 5B illustrates the same signal under the same conditions as FIG. 5A but after the Massa device has been modified by insertion of six 1 inch diameter, ¼ inch thick, circular polyurethane damping pads into the cup and closing it back up again (see FIG. 3 and related discussion above). The ringing rapidly decayed. There was a noted decrease in the time for ringing to stop as indicated by arrow 102 in FIG. 5B as compared to that of the unmodified device (arrow 100 in FIG. 5A). No returning of the device was necessary. The horizontal and vertical scales are the same as those of FIG. 5A.

Figure 5C:
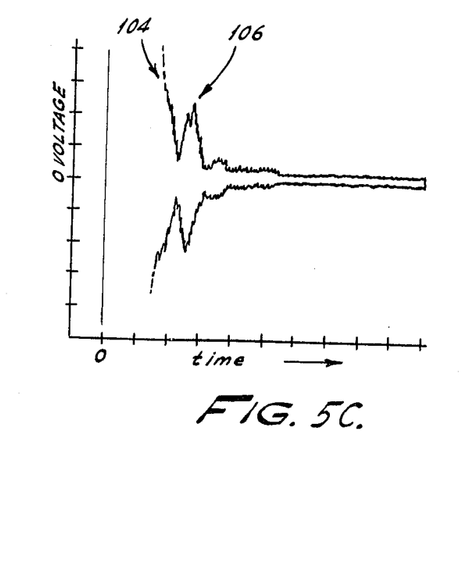

FIG. 5C illustrates the waveform pattern of the output signal at an amplifier stage such as could be used as a first stage of the multi-stage amplifier 89 for the unmodified Massa device (without pads or horn). Arrow 104 indicates the output signal due to the transmission burst. The "blip", indicated by arrow 106, which starts at 5 milliseconds, peaks at about 5.9 milliseconds, and ends at about 6.5 milliseconds, is an echo obtained by pointing the ultrasonic transducer directly at the floor from a distance of 3.25 feet. Node that if the echo surface were nearer than 3.25 feet, the echo would be indistinguishable from the transducer ringing waveform. The horizontal scale is 2 milliseconds per division, the vertical scale is 50 millivolts per division. The echo is about 170 millivolts, peak-to-peak.

Figure 5D:
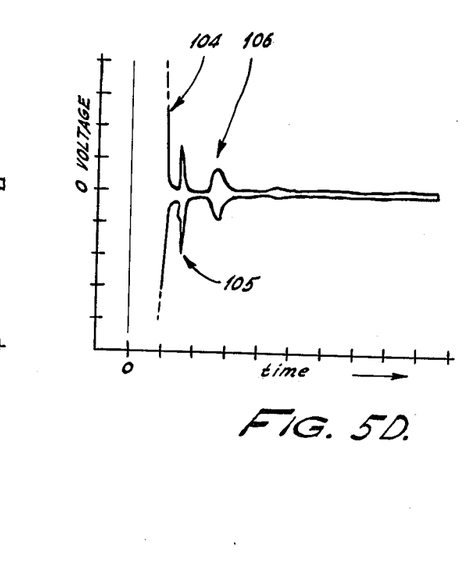

FIG. 5D illustrates the pattern of the same output signal as FIG. 5C, for the same Massa device, but after modification with six 1-inch diameter, ¼-inch thick, circular polyurethane foam damping pads (without horn). The echo signal 106 reflected at 3.25 feet from the floor appears in the same position (timewise) as in FIG. 5C, but is much easier to distinguish from signal 104. It can be seen that signal 106 could be distinguished from signal 104 if reflected from a surface as near as about 3 milliseconds before it becomes indistinguishable from the transducer ringing. Also note that the amplitude of the echo signal, at about 6.5 milliseconds, (3.25 feet from the floor) has decreased to about 60 millivolts, or 30% of the undamped echo amplitude. The "blip" indicated by arrow 105 is a circuit transient caused by deactivation of the blanking generator. This signal would not be identified as a valid echo signal and thus can be ignored (see discussion on echo detector 96 above).

Figure 5E:
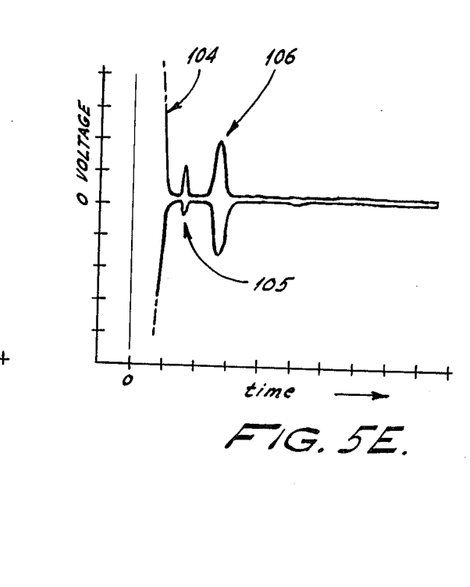

FIG. 5E illustrates the pattern of the same output signal as in FIGS. 5C and 5D for the same Massa transducer device, but which has been modified both with the damping pads (as in FIG. 5D) and with the addition of an acoustical horn 38 (see FIG. 2).

The horn is a PVC cylindrical structure having a 2¾-inch O.D. and including a frusto-conical cavity 42 with a slightly less than 2¾-inch I.D. sound emitting end 44 and a slightly greater than 1-inch I.D. throat 46, with an angle A of 9° to 10° (see FIG. 2). The "active" horn length L (FIG. 2) is 4 5/16 inches. Oscillating member 34 is located at its "tuned" position in bore 40, approximately 1/16 inch rearward of throat 46.

The horizontal scale of FIG. 5E is the same as the horizontal scales of FIGS. 5C and 5D, however the vertical scale of FIG. 5E is 0.2 volts per division, as contrasted with 0.50 millivolts per division in FIGS. 5C and 5D. A comparison of the output wave patterns of FIGS. 5D and 5E, shows that *nothing* has been affected by addition of horn 38, except the echo signal strength which has increased in amplitude to about 700 millivolts, peak-to-peak, or just over 10 times the amplitude observed in FIG. 5D without the horn (at the reference level of 3.25 feet).

From the above illustrative oscilloscope patterns, it is evident that a significant performance increase can be obtained by modifying a commercially available low cost, small piezoelectric disk transducer with damping pads alone, or with both damping pads and horn. Significant increase, on the order of about ten times, of the maximum effective range of such a device for level indicator purposes is achieved through the use of a horn assembly, such as that described. A significant reduction in the minimum distance detection range is provided by means of the introduction of a resilient, compressible damping pad means into the casing. The damping pad means provides mechanical damping to significantly reduce undesirable ringing, and may also act to absorb some of the backwave to significantly increase the detection performance of the transducer and also to reduce the blanking time required before an echo pulse is detected. Since the minimum range is dependent upon the earliest that a reflected echo signal can be measured, reduction in the time of ringing means smaller minimum detection distance.

Small transducers typically have low performance characteristics for ultrasonic level detection. One of their primary uses is for intrusion detection devices where a broad beam width is useful. The present invention provides simple procedures to convert such a low performance device into a high performance ultrasonic level detection device. The cost of a comparable known large piezoelectric device suitable for such purposes is 10 times the cost of the thus modified device; the cost of a comparable magnetic transducer is 50 times as much. Furthermore, the power requirements for the small element transducer modified according to the invention will be about 5 to 20 milliwatts on a short duty cycle; the power requirements for a comparable large device are about 500 to 1,000 watts.

The significance of this modification is appreciated when it is applied to the application of a level indicator that must perform over a wide variety of temperatures, including, for example, operating at subfreezing temperatures as low as −30° F. Larger crystals are inappropriate for this purpose because of their tendency to crack; and without the modifications taught by this invention, the smaller crystals would also be inappropriate for this purpose because of their poor performance qualities. Not only does this invention accomplish a heretofore unattainable result, but it does so at a reduction in cost over conventional devices.

We claim:

1. The combination in an electroacoustic transducer, of a cup-shaped housing having front and side walls, the front wall comprising an oscillating diaphragm, a piezoelectric element being bonded to the oscillating member interiorly of the cup, a resilient, compressible material located interiorly of said cup, clamping means for holding said material under compression within the cup, said clamping means providing pressure to hold said resilient compressed material in pressure contact with the piezoelectric element and with the diaphragm member, electrodes attached to the surface of said piezoelectric element and means comprising electrical conductors connected to said electrodes for delivering electrical impulses for driving said piezoelectric element.

2. The combination of claim 1, wherein said clamping means exerts a compressing force over substantially the whole area of said material.

3. The combination of claim 1, wherein said resilient, compressible material comprises polyurethane foam.

4. The combination of claim 1, wherein said resilient, compressible material comprises a good mechanical vibration damping material and good sound-absorbtive material.

5. The combination of claim 1, further comprising a stem on which said cup-shaped housing is mounted, and yieldable bonding means for mounting said housing to a front end of said stem.

6. The combination of claim 1, further comprising an acoustical horn having a tapered opening therein diverging outwardly from a small end to a large end, and means positioning said horn with its small end adjacent to said oscillating diaphragm.

7. The transducer assembly of claim 1, wherein the resilient, compressible backing member comprises polyurethane foam material.

8. The combination of claim 1 wherein the compressible material has a cross sectional area as great as the cross sectional area of the cup and comprises a column at least twice the height of the cup side wall in the uncompressed state.

9. The combination in an electroacoustic transducer of a cup-shaped housing having a front wall and side walls, the front wall comprising an oscillating member including a piezoelectric element located interiorly of the cup, a resilient, compressible material located interiorly of said cup in a compressed state against said oscillating member, clamping means for holding said material under compression within the cup, said resilient, compressible material comprising a plurality of laminae or pads each having generally the same cross section as the cross section of the interior of the cup, electrodes attached to the surface of said piezoelectric element, and means comprising electrical conductors connected to said electrodes for delivering electrical impulses for driving said piezoelectric element.

* * * * *

UNITED STATES PATENT AND TRADEMARK OFFICE
CERTIFICATE OF CORRECTION

PATENT NO. : 4,264,788
DATED : April 28, 1981
INVENTOR(S) : John F. Keidel and Larry P. Kahhan It is certified that error appears in the above—identified patent and that said Letters Patent is hereby corrected as shown below:

In Abstract, line 1 "accoustical" should read --acoustical--.

Column 2, line 7 "various" should read --versus--.

Column 2, line 34 "existance" should read --existence--.

Column 8, line 2 "by" should read --of--.

Column 8, line 12 "he" should read --the--.

Column 8, line 36 after member insert --34--.

Column 9, line 59 "propogation" should read --propagation--.

Signed and Sealed this

Fourth Day of August 1981

[SEAL]

Attest:

GERALD J. MOSSINGHOFF

Attesting Officer     Commissioner of Patents and Trademarks